No. 761,009. PATENTED MAY 24, 1904.
F. REYPENS-DE SCHUTTER.
MALTING ROLLER.
APPLICATION FILED JULY 21, 1902.
NO MODEL.
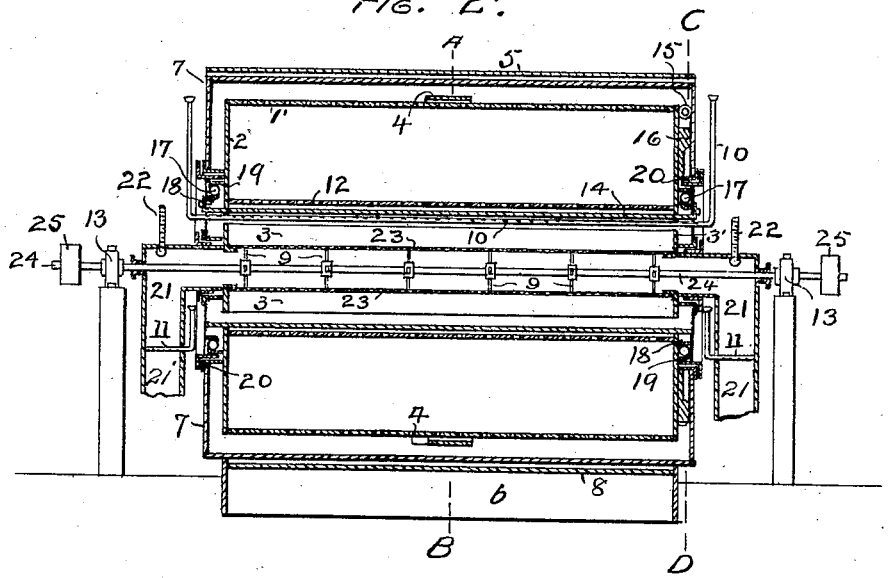
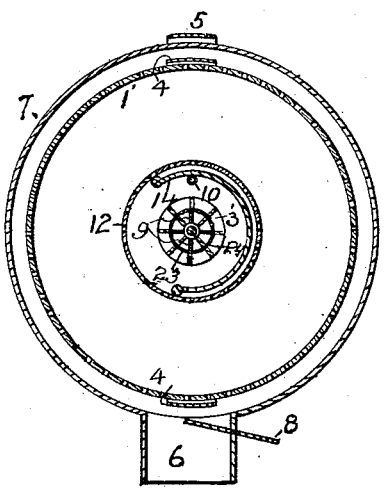
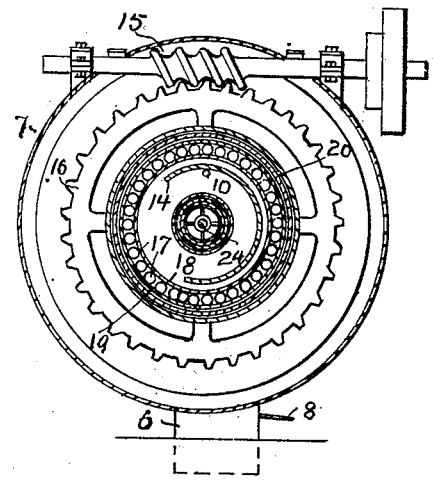
WITNESSES
INVENTOR
François Reypens-De Schutter
by Alexander & Co
ATT'YS No. 761,009. Patented May 24, 1904.

UNITED STATES PATENT OFFICE.

FRANÇOIS REYPENS-DE SCHUTTER, OF VIEUX DIEU, BELGIUM.

MALTING-ROLLER.

SPECIFICATION forming part of Letters Patent No. 761,009, dated May 24, 1904.

Application filed July 21, 1902. Serial No. 116,474. (No model.)

*To all whom it may concern:*

Be it known that I, FRANÇOIS REYPENS-DE SCHUTTER, malting master, a subject of the King of Belgium, residing at Vieux Dieu, Belgium, have invented a new and useful Malting-Roller; and I do hereby declare the following to be a full, clear, and exact description of the same.

This invention relates to apparatus for manufacturing malt from grain; and it consists in certain combinations and arrangements of parts hereinafter described, and particularly pointed out in the claims.

In the accompanying drawings, Figure 1 is a cross-section on the line A B, Fig. 2. Fig. 2 is a longitudinal section on a vertical central plane of Fig. 1. Fig. 3 is a cross-section on the line C D, Fig. 2.

Journaled in suitable bearings 13 is a horizontal shaft 24, adapted to be rotated by suitable means, such as the pulleys 25. Projecting radially from said shaft are a plurality of arms 9, (preferably provided with a cylindrical sieve 23,) on which are mounted longitudinal radial wings 3. This forms a main inner blower revolving through the entire length of a perforated cylinder 12, concentric with the axis of a revoluble drum 1'. The wings 3 are bound together on each edge by a perpendicular ring 3', of sheet metal, near the horizontal elbows 21, concentric with the shaft 24 and terminating in an open end adjacent to the open end of said ring, the space between being preferably provided with a stuffing-box. The elbows 21 are a continuation of the downward air-pipes 21' at each end of the machine, and they can be connected at will directly either with a source of pure and dry air or with a hot-air generator or first with an external blowing-engine and then with said air-supplies. Indicating devices, such as thermometers 22, may be applied to said pipes 21, and in each of them is a perforated water-supply pipe 11.

A stationary casing 7 is arranged concentric with the shaft 24, having in its top doors 5 and in its bottom a depending spout 6, extending the entire length of said casing and provided with a damper or gate 8. The ends of the casing fit tightly around the horizontal elbows of the air-pipes 21. Annular flanges 18 project inwardly from said ends concentric with the shaft, and a drum is revolubly supported on said flanges, preferably by means of ball-bearings, the balls 17 being held between the flanges 18 and concentric flanges 19 on the heads 2 of said drum.

Annular stuffing-boxes 20 inclose the flanges and make the fissures air-tight.

The body of the drum is composed of two concentric perforated cylinders 1' 12, secured to the heads 2. The outer cylinder 1' has doors 4 to register with the doors 5 in the casing 7. The smaller inner cylinder 12, open at the two ends, surrounds the circular series of wings 3 at a suitable distance, and between said wings and the cylinder 12 is a segmental cylindrical screen 14, of sheet metal, covering nearly three-fourths of the cylinder 12 and projecting beyond the heads 2 of the drum and the heads of the casing 7 and there provided with flanges which are suitably secured to said casing-heads by bolts or other fastenings which permit an angular adjustment of said screen. The adjustment may be such as to shut the right-hand side of the perforated cylinder 12 when the drum is turning to the right or to shut the left-hand side of said cylinder when the drum is turning to the left, in either case compelling the air-current to pass through the entire cylinder 12 and out through the mass of grain under treatment at the point where said grain is lifted and agitated by the rotating drum.

A perforated pipe 10 passes through the inner cylinder 12 between the screen 14 and the outer edges of the wings 3. Its ends are carried out through the ends of the casing and are turned up, as shown.

Secured to a head 2 of the drum is a worm gear-wheel 16, with which meshes a worm 15 on a shaft passing transversely through the casing 7 and rotatable by suitable means to impart a rotary motion to the drum, which revolves freely on its ball-bearings.

The operation of my apparatus is as follows: The doors 4 and 5 having been made to register, the grain, previously screen and cleaned, is introduced into the drum through them until the drum is about half full. Then the doors being closed, the drum is set in revolution by the worm and gear. The shaft 24 of the inner blower is started rotating by the pulleys 25, and besides its blast a current of air can be sent into the sucking-pipes 21 by any outer blower. The water is then admitted to the pipe 10, from which it escapes, and meeting the wings 3 it is reduced to a uniform fine rain or spray and is intimately mixed with the air and is uniformly distributed upon the grain in the revolving drum. The waste water escapes through the spout 6. The object of this first operation is to wash the grain, oxygenate it, and thoroughly soak it, thus doing away with steeping the grain in steeping-cisterns and obviating the production of moldiness during subsequent operations. When the washing-water flows off in clear condition, the pipe 10 is shut off and the pipes 11 are opened. Immediately a fine spray issues therefrom and is carried over the wings 3, which distribute it uniformly in the nature of a dense oxygenated fog into the grain until germination manifests itself by the appearance of the radicle or germ. This means of producing an oxygenated fog advantageously replaces the cumbersome and costly coke-chamber and other costly devices heretofore devised for saturating the air during the germination. The embryo grows better in this cold-sweating process than in any other system, so far as my observation goes, because the carbonic-acid gas produced naturally flows downward and immediately escapes through the spout 6 and also because the grain is provided with an abundant supply of oxygen, which renders the germ robust and full of life, vigor, and health. When the acrospire has sufficiently developed, the water is shut off and the grain is withered and its moisture carried away by a blast of cold dry air. This withering is considered as terminated when about ninety-five per cent. of the humidity of the green malt has been removed. The drying is then continued by a mixture of cold and hot air admitted through the two pipes 21 and intimately mixed by the rotating wings 3. The temperature can be controlled by varying the relative amount of cold and hot air by means of suitable dampers in the pipes 21. Gradually this cold air is shut off and the hot air turned on until a kiln-drying heat is attained. Finally the damper 8 is closed, and the hot-air treatment is continued in a practically-closed drum, this finishing heat by a certain torrefaction under pressure of the starch or fecula of the grain giving to the malt the flavor called "kiln-dried aroma," which imparts to the beer a palatableness now so much desired.

The small rootlets have been sieved through the perforated cylinders and collected during the dessication of the malt. The latter completely finished and cleaned is emptied from the drum by bringing the doors 4 in line with the spout 6 and opening them.

The principal advantages of my invention are great economy of space, of cost of installation, of management, of time, of water, of wages, of raw material, and the like. It also excels especially in enabling one to manufacture from almost any grain a very uniform malt having strong saccharine properties and giving a very superior extract.

Having thus described my invention, what I claim is—

1. The combination with a revoluble drum, composed of concentric perforated cylinders, secured to suitable heads, of an inner rotatable blower, comprising wings which extend the entire length of said revoluble drum, in order to produce and distribute a direct and complete uniform air-current, and means for supplying air and water to said blower.

2. The combination with a revoluble drum, comprising perforated concentric cylinders, of an inner blower, having wings extending the entire length of said revoluble drum, and a segmental screen angularly adjustable between said blower and the inner cylinder in order to force the air-current to pass through any portion of said perforated cylinders.

3. The combination with a stationary casing, of a revoluble drum comprising perforated cylinders secured to heads, ball-bearings between said heads and the casing, means for revolving said drum from the exterior of the casing, and a blower inside said drum.

In testimony whereof I have signed this specification in the presence of two subscribing witnesses.

FRANÇOIS REYPENS-DE SCHUTTER.

Witnesses:
CHARLES HONOW,
GREGORY PHELAN.